Aug. 6, 1935.   H. REKONTY   2,010,414
FRUIT AND VEGETABLE PEELER AND SLICER
Filed Aug. 10, 1934
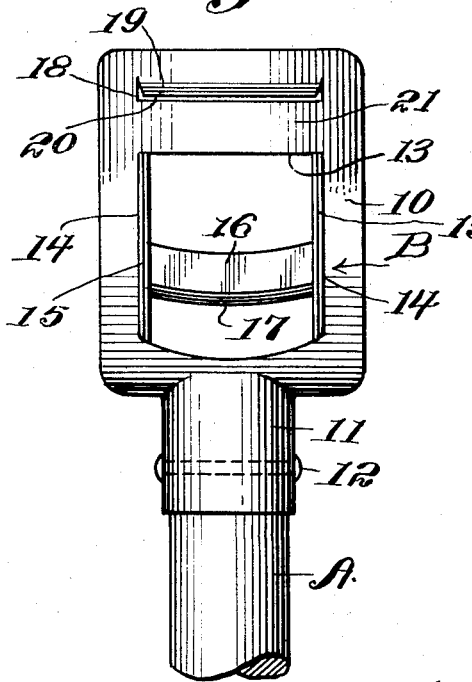
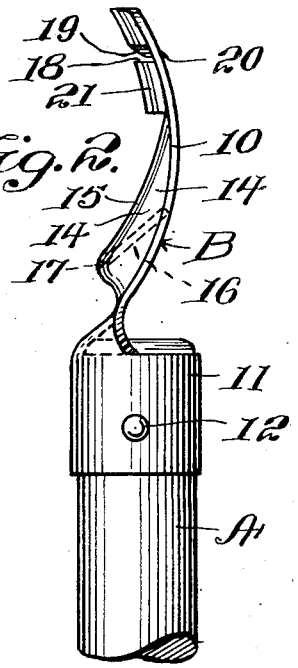
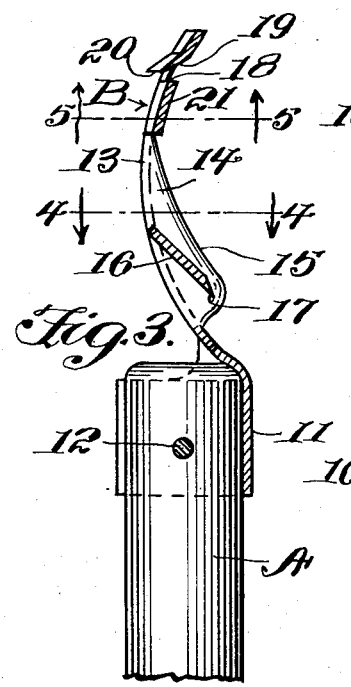
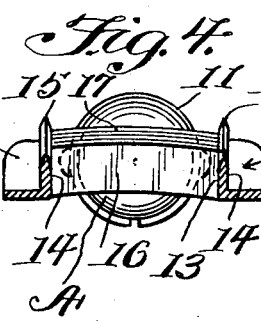
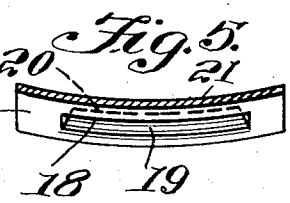
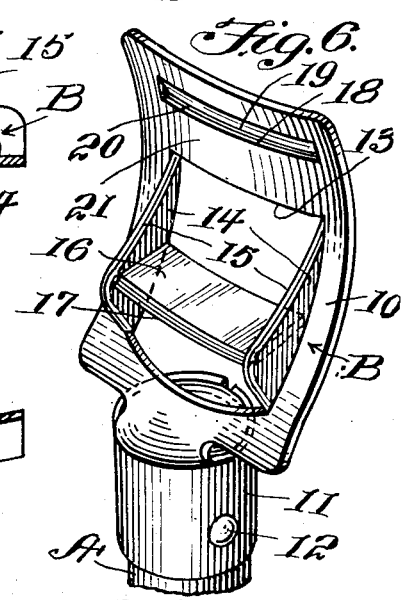
Harry Rekonty INVENTOR
BY Victor J. Evans & Co.
ATTORNEY
WITNESS: G. J. L. Wright Patented Aug. 6, 1935

2,010,414

UNITED STATES PATENT OFFICE 2,010,414

FRUIT AND VEGETABLE PEELER AND SLICER

Harry Rekonty, Norfolk, Va.

Application August 10, 1934, Serial No. 739,313

1 Claim. (Cl. 146—3)

The invention relates to a combination fruit and vegetable peeler and slicer and more especially to an implement for peeling fruits, such as oranges or other citrus fruits, as well as the paring or slicing of vegetables.

The primary object of the invention is the provision of an implement of this character, wherein it greatly facilitates the peeling of fruits and the slicing of vegetables and is of a kind that is operative by hand and through a pulling stroke, the implement being of novel construction.

Another object of the invention is the provision of an implement of this character, wherein the cutting blades are disposed in a fashion to assure the convenient and easy peeling of fruits when the implement is applied at one side thereof and for the paring and slicing of vegetables on reversing the said implement, the latter being handy for use and readily and easily manipulated for the successful operation thereof.

A further object of the invention is the provision of an implement of this character which is extremely simple in construction, thoroughly reliable and efficient in its purposes, readily and easily handled, compact, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary elevation of the implement constructed in accordance with the invention.

Figure 2 is a side view thereof.

Figure 3 is a vertical longitudinal sectional view.

Figure 4 is a sectional view on the line 4—4 of Figure 3 looking in the direction of the arrows.

Figure 5 is a sectional view on the line 5—5 of Figure 3 looking in the direction of the arrows.

Figure 6 is a perspective view of the implement.

Similar reference characters indicate corresponding parts throughout the several views in the drawing.

Referring to the drawing in detail, the implement embodying the present invention comprises a handle, a portion thereof being indicated at A, and this handle may be of the required length and is preferably circular in cross section. Upon one end of the handle A is mounted a head comprising a sheet metal body B, preferably made from a single piece of sheet material cut to provide a substantially rectangular-shaped frame 10 joined with a split ferrule 11 which embraces the handle B, and this ferrule is made fast through the medium of a cross pin or rivet 12 to the said handle, the rivet being passed transversely through the handle and through opposite points of the ferrule 11 so that the head and handle are fixed one to the other. The frame 10 is bent into arcuate form and is provided with an open center 13, the side edges presenting blades 14 which extend outwardly from one side of the frame 10, preferably at the concaved side thereof, and are parallel with each other, with tapered beveled cutting edges 15.

Straddling the opening 13 in the frame between the blades 14 is an angularly disposed peeler constituted by a blade 16 having the beveled cutting edge 17 slightly inset with relation to the cutting edges 15 of the blades 14. This blade 16 is angled in the direction of the wider portion of the blades 14 and extended from the concaved side of the frame 10.

The outer end of the frame 10 has formed therein a transversely disposed slot 18, the outermost long edge of which is turned in the direction of the convex side of the frame 10 to provide a slicing blade 19 having the cutting edge 20. The formation of the slot 18 in the frame 10 provides a cross web 21 between said slot and the opening 13 in the frame and this web 21 is upset at the concaved side of the same frame 10 so that the blade 19 will be pronounced at the convex side of the frame for slicing purposes.

The blade 16 will function not only as a peeler but also as a parer, while the blades 14 function to cut into the skin of a fruit, such as an orange, and limit the cutting depth of the blade 16 during the peeling of the fruit.

In the use of the implement, the frame 10 is placed against the fruit to be peeled, the concaved side of this frame being in confronting relation to the fruit, and by a pulling action upon the handle A the said fruit will be conveniently peeled for the removal of its skin. The blade 19 protruded from the convex side of the frame 10 is usable for paring or slicing vegetables, fruits or the like.

What is claimed is:

An implement of the character described comprising a frame having a curvature both transversely and longitudinally thereof and formed with an open center, similar tapered blades arranged at opposite sides of the opening and extending outwardly from one face of the frame, and an angularly disposed blade bridging the opening and carried by the tapered blades to be disposed with its cutting edge directed toward the wider ends of the tapered blades and lying wholly on that side of the frame from which project the said tapered blades, the angularly disposed blade being slightly curved in the direction of its longitudinal extent.

HARRY REKONTY.